Patented Feb. 20, 1951

2,542,898

UNITED STATES PATENT OFFICE 2,542,898

PEROXIDE LIQUID ANTISEPTICS

Ethan Allan Brown, Boston, Mass., Manuel H. Gorin, San Francisco, Calif., and Harold Alexander Abramson, New York, N. Y.

No Drawing. Application October 7, 1948, Serial No. 53,382

5 Claims. (Cl. 167—58)

This invention relates to improvements in liquid antiseptics and to methods of preparing and compounding the same, and is particularly concerned with improved antiseptics of the peroxide type.

The nature and value of hydrogen peroxide as an antiseptic has long been known, and numerous peroxide-containing liquid antiseptics have heretofore been available. Without exception, however, in the liquid antiseptics heretofore known and used, the hydrogen peroxide ingredients have been used in aqueous solution. These are unstable in dilute solutions as normally used, since the oxygen is readily given off even though the material is kept in amber or green colored bottles and in a cool place. Such solutions are undependable for bactericidal use since, with age, they deteriorate with great rapidity. Even though freshly made, the action of the oxygen in aqueous solutions is transient, since it is liberated rapidly and is in contact with the bacteria for an insufficient period of time to enable the active ingredients to accomplish effectively their intended bactericidal action. Since such aqueous solutions are free-flowing, their contact with bacteria is still more transient. The vehicles are not hygroscopic, and therefore do not wash the wound excepting superficially, nor do they promote healing.

An antiseptic of the peroxide type which avoids these and other difficulties is disclosed in our U. S. Letters Patent 2,430,450, granted November 11, 1947. It is there proposed to employ a solution of urea peroxide in a polyhydric alcohol, for example glycerol, such a solution being much more stable, effective, and efficient than aqueous solutions of peroxide.

We have also discovered, as set forth more particularly in our prior application, Serial No. 662,414, filed April 15, 1946, which is now abandoned, of which this application is a continuation-in-part, that by introducing in a solution of urea peroxide in polyhydric alcohol a small proportion of 8-hydroxy-quinoline, a surprising increase in bactericidal action may be achieved.

We have also discovered that a similar synergistic action is exhibited by a solution in polyhydric alcohol of hydrogen peroxide containing a small amount of 8-hydroxy-quinoline, the behavior of the solutions so formed being generally comparable to those in which the peroxide is urea peroxide.

Thus in both cases, anhydrous glycerol gives a more stable solution than glycerol containing small amounts of water, although in the absence of 8-hydroxy-quinoline, a solution of urea peroxide in anhydrous glycerol is decidedly more stable than a similar solution of hydrogen peroxide, the stability of the latter being somewhat below reasonable commercial limits. Consequently, while solutions of urea peroxide in glycerol as described in our prior patent aforesaid are quite satisfactory, the addition of 8-hydroxy-quinoline is essential to the production of an acceptable antiseptic employing a solution of hydrogen peroxide in polyhydric alcohol, and the addition of 8-hydroxy-quinoline to solutions of either peroxide greatly enhances the bactericidal action of the solution.

We have also found that alcoholic solutions of these peroxides are quite stable even in the presence of substantial quantities of water, provided 8-hydroxy-quinoline is also present.

It is therefore an object of the invention to provide a stable antiseptic liquid comprising either urea peroxide or hydrogen peroxide, or mixtures thereof, in solution in glycerol, and containing a small amount of 8-hydroxy-quinoline, for instance at least about 0.01% by weight of the solution, whereby the bactericidal effectiveness of the solution becomes significantly greater than that of the peroxides in glycerol alone.

Although, as hereinbefore indicated, the addition of 8-hydroxy-quinoline permits the inclusion in the antiseptic of considerable amounts of water without adversely affecting stability of the peroxide, it is important to the effectiveness of the antiseptic that the liquid be both hygroscopic and fairly viscous, and we preferably employ a solvent containing not less than about 65% glycerol, or its equivalent, in any alcohol-water mixture.

The bacteriotoxic action of solutions of both urea peroxide and hydrogen peroxide in glycerol have been measured in the presence and absence of oxine. The method used is a modification of the F. D. A. cup and plate method with the zones of bacterial inhibition being determined both by visual observation and subculturing. As an example of the synergistic action between both urea peroxide and hydrogen peroxide with 8-hydroxy-quinoline, the results obtained in the case of a particular strain of beta streptococcus are given below:

| Solution | Area of Zone of Inhibition (Sq. millimeters) Medium Contains 10% Serum | |
|---|---|---|
| | Visual | Subculture |
| 4% Urea Peroxide (1.46% $H_2O_2$) in Glycerol | 835 | 1,385 |
| 4% Urea Peroxide plus 0.1% 8-Hydroxy-Quinoline in Glycerol | 937 | 2,206 |
| 1.46% Hydrogen Peroxide in Glycerol | 1,256 | 2,587 |
| 1.46% Hydrogen Peroxide plus 0.1% 8-Hydroxy-Quinoline in Glycerol | 1,170 | 4,071 |
| 0.1% 8-Hydroxy-Quinoline in Glycerol | 254 | 301 |

It is evident that, as determined by subculturing, the area of inhibition for this particular organism in the case of both urea peroxide and hydrogen peroxide plus 8-hydroxy-quinoline is substantially greater than the sum of the areas produced by the oxine and peroxide separately. While such marked synergistic action is not observed with all organisms tested, in the case of about one-third of the organisms tested the subculture area for both urea peroxide and hydrogen peroxide in glycerol containing oxine was greater than that of the sum of the areas produced by the peroxides and oxine separately in glycerol. Furthermore, with about three-quarters of the organisms tested, the areas produced by the peroxide solutions containing oxine were measurably greater than those produced by the peroxides alone in glycerol. It was thus demonstrated that the addition of small amounts of oxine to both urea peroxide and hydrogen peroxide in glycerol substantially enhances the antiseptic properties of the solutions.

An explanation for this synergistic action is not as yet apparent although it is possible that it is a result of a chemical reaction between 8-hydroxy-quinoline and the peroxide. Evidence for the occurrence of such a reaction is inferred from the observation that in some cases a pronounced increase in the bacteriotoxic activity of the solution occurs with time. For example, a 4% solution of urea peroxide in glycerol, containing 0.1% 8-hydroxy-quinoline, when measured by the F. D. A. cup and plate method and the standard F. D. A. *Staphylococcus aureus* (209), gave on preparation a zone of bactericidical power which measured radially 12.3 mm. Thirty days later, the zone measured 13.6 mm., and within ninety days the zone had reached 16 mm., no substantial change in bactericidal action being thereafter noted. Similar tests with aqueous solutions of urea peroxide, containing 8-hydroxy-quinoline, showed no comparable increase in bacteriostatic action over the same period of time.

As a concomitant phenomenon indicating the possibility of a chemical reaction, it was noted that the peroxide-glycerol solutions containing 8-hydroxy-quinoline changed color from light yellow to orange and became slightly cloudy during the period of examination, but that no precipitate formed. The change in color was gradual and reached a maximum in about ninety days, no further change being observed. In addition, the new antiseptic is far more stable than prior antiseptics containing peroxides, even when prepared with slightly impure solvents. Thus we have observed that the traces of metallic impurities present in commercial glycerol exert an undesirable effect on the stability of our urea-peroxide antiseptic. The addition of a small quantity of 8-hydroxy-quinoline as proposed herein serves to inactivate the metallic constituents, thereby permitting the use of cheaper and more readily available grades of solvent.

The amount of 8-hydroxy-quinoline which is necessary to achieve appreciably improved results may vary widely. In general, we prefer to employ in commercial antiseptics amounts of this improving agent ranging from 0.01% to 0.1%. Much higher percentages of 8-hydroxy-quinoline or its salts may be employed, since the agent is not injurious to tissues and the excess exerts merely the added bacteriostatic action which it normally possesses. It may, of course, be used in the form of its water-soluble salts, such as the sulphate, and the use of such salts is contemplated herein.

As is pointed out in our prior application hereinbefore mentioned, pure urea peroxide may be added to the solvent as a solid, as for instance, in powder form. Urea peroxide is not easily wetted by nonaqueous glycerin, the rate of solution being determined by the temperature, the viscosity of the solvent and the amount of agitation used, or both, by the state of division of the urea peroxide, and by other factors. The time necessary to dissolve the urea peroxide will depend also upon the concentration of the urea peroxide. The addition of water decomposes the urea peroxide, but a stable solution may, nevertheless, be obtained if 8-hydroxy-quinoline is added.

The carrier liquid may be any one of a number of liquids having the necessary physical characteristics, which will act as a solvent for the urea peroxide, and which will not inactivate the catalase or peroxidase in or on animal or vegetable tissue. Thus, polyhydric alcohols other than glycerin, are suitable for this purpose, as, for instance, the glycols and other liquid polyhydric alcohols. Glycols which are especially suitable are propylene glycols, ethylene glycol, triethylene glycol, glycerol polymers and glycerol ethers, trimethylene glycol, tetramethylene glycol, etc. The carrier liquid which we prefer, however, is glycerol, this substance being highly viscous, readily receiving urea peroxide in solution and serving, in the presence of 8-hydroxy-quinoline, to hold either peroxide in solution in a satisfactory manner over long periods of time, as when it is in storage or transportation under the temperature conditions normally encountered. Various other polyhydric alcohols may be employed in admixture with glycerol, such, for instance, as ethylene glycol, propylene glycol and the like, to obtain solutions of higher or lower viscosity.

In addition to being a more stable peroxide compound, this antiseptic liquid has many other advantageous properties. The glycerols, glycols, and other vehicles listed—since they do not dry or evaporate—permit the antiseptic to remain in contact with a contaminated wound for a long period of time, thereby exerting a prolonged bactericidal effect. This is especially necessary for wounds contaminated with anaerobic spore-forming bacteria which are not killed except when in contact with the bactericidal liquid for some time. As the solutions do not dry, they are therefore capable of being used for prolonged periods of time without replenishment. A wet dressing with this material continues its effect for many hours without requiring change.

Another advantage of this antiseptic solution is the fact that the glycerols and other polyhydric alcohols are hygroscopic. They draw plasma from the deeper parts of the wound which are not normally reached by an antiseptic, the plasma pulling with it the bacteria, which are, therefore, subjected to bactericidal action. The usual antiseptics do not have this power and, therefore, do not sterilize the deeper parts of puncture wounds.

When urea peroxide in glycerol breaks down into urea and hydrogen peroxide, the urea which is present acts as a peptizing and granulating agent supporting the healing of the damaged tissues. Urea has been used for many years for this purpose.

The use of this antiseptic, therefore, causes the following sequence of events to occur: A potent, stable, non-allergenic agent, urea peroxide or hydrogen peroxide in glycerol is applied to a wound. It is viscous and, therefore, stays in place. Water in the blood plasma affects the urea-peroxide-solution giving terminal solutions of urea and hydrogen peroxide. The hygroscopic solution washes out the wound by drawing plasma from its deeper parts, subjecting any bacteria present to a long oxidizing action. When the agent employed is urea peroxide, the urea which remains peptizes dead tissue and promotes healing. The solution, being an oxidizing agent, is effective in this form against more types of bacteria than are affected by any known antiseptic, having shown clinical effectiveness against both gram-positive and gram-negative bacteria, as well as to aerobic and anaerobic organisms. No other known antiseptic is effective against all of these types of micro-organisms in this way.

When the urea peroxide is added to the glycerol in the form of a solid compound of urea and hydrogen peroxide the amount of urea peroxide added should be between about 0.2% and the amount present in a saturated solution (about 25%), and preferably between approximately 2% and 10%, by weight of the total weight of the solution. The amounts of urea peroxide added will be subject to very considerable variations, depending upon the use to which the antiseptic is to be placed. Additional urea may also be added to promote greater peptizing and healing effects as well as additional bacteriostatic and bactericidal potency. When hydrogen peroxide alone is employed, comparable amounts based on the hydrogen peroxide content of the urea peroxide (about 36%) are used, and 0.7% to 7% by weight is satisfactory although up to 30% by weight of hydrogen peroxide may be employed for some purposes.

It is also possible to form this antiseptic solution by adding nonaqueous hydrogen peroxide to glycerol, or by using aqueous solutions of hydrogen peroxide and removing the water by any of the known technical means, as by a dehydrating agent or evaporating methods, and thereafter adding urea to the water-free glycerol-hydrogen peroxide solution.

The cost of the antiseptic is low, both with respect to starting materials and formation of the final compound, and it may be used for all purposes for which liquid antiseptics are commonly employed.

The term "nonaqueous" as applied to the antiseptic of the present invention designates one in which the water is present in minimum amount and insufficient of itself to destroy the stability of the peroxide.

Having thus described the invention, what is claimed as new and desired to be secured by Letters Patent is:

1. An antiseptic liquid composition, comprising substantially pure urea peroxide dissolved in glycerol, and containing water in amount not greater than about 35% of the amount of glycerol, said solution containing 8-hydroxy-quinoline in amount sufficient to enhance appreciably the bactericidal effectiveness of the solution.

2. An antiseptic liquid composition, comprising a peroxide selected from the group consisting of hydrogen peroxide, urea peroxide, and mixtures thereof, dissolved in polyhydric alcohol having not more than three carbon atoms, the peroxide constituting from 0.2% to 20.0% by weight of the solution, and at least about 0.01% of 8-hydroxy-quinoline.

3. A nonaqueous antiseptic liquid composition, comprising substantially pure urea peroxide dissolved in glycerol, the urea peroxide constituting from 0.2% to 20.0% by weight of the solution, and at least about 0.01% of 8-hydroxy-quinoline.

4. An antiseptic liquid composition, comprising a bactericidal agent selected from the group consisting of hydrogen peroxide, urea peroxide, and mixtures thereof, dissolved in a polyhydric alcohol having not more than three carbon atoms, and containing water in amount not greater than about 35% if the amount of glycerol, said solution containing 8-hydroxy-quinoline in amount sufficicient to enhance appreciably the bactericidal effectiveness of the solution.

5. A nonaqueous antiseptic liquid composition, comprising a bactericidal agent selected from the group consisting of hydrogen peroxide, urea peroxide, and mixtures thereof, dissolved in glycerol, said solution containing 8-hydroxy-quinoline in amount sufficient to enhance appreciably the bactericidal effectiveness of the solution.

ETHAN ALLAN BROWN.
MANUEL H. GORIN.
HAROLD ALEXANDER ABRAMSON.

REFERENCES CITED

The following references are of record in the file of this patent:

UNITED STATES PATENTS

| Number | Name | Date |
|---|---|---|
| 1,018,240 | Forregger | Feb. 20, 1912 |
| 2,430,450 | Brown | Nov. 11, 1947 |

OTHER REFERENCES

Reid: Annals of Surgery, Oct. 1943, pages 741–750.

Combes: New York State Jour. of Medicine, vol. 37, pp. 1927, 1928 (Nov. 15, 1937).

Tritton: Quarterly Jour. and Yearbook of Pharmacy (1939), vol. 12, pp. 448, 449.

Fisher: Jour. Amer. Med. Assoc., vol. 122, July 24, 1943, p. 855.

Goodman: Cosmetic Dermatology (1936) page 171.